United States Patent
Pri-Tal et al.

(10) Patent No.: US 10,275,909 B2
(45) Date of Patent: Apr. 30, 2019

(54) SYSTEMS AND METHODS FOR AN INTEGRATED SYSTEM FOR VISUALIZING, SIMULATING, MODIFYING AND 3D PRINTING 3D OBJECTS

(71) Applicant: 3D Systems, Inc., Rock Hill, SC (US)

(72) Inventors: Dan Pri-Tal, Kibbutz Ma'ale HaHamisha (IL); Roy Porat, Tel Aviv (IL); Oren Kalisman, Tel Aviv (IL)

(73) Assignee: 3DSYSTEMS, INC., Rock Hill, SC (US)

( * ) Notice: Subject to any disclaimer, the term of this patent is extended or adjusted under 35 U.S.C. 154(b) by 73 days.

(21) Appl. No.: 15/360,313

(22) Filed: Nov. 23, 2016

(65) Prior Publication Data
US 2018/0144516 A1 May 24, 2018

(51) Int. Cl.
| G06K 9/00 | (2006.01) |
| G06T 11/00 | (2006.01) |
| G06T 7/11 | (2017.01) |
| B33Y 50/00 | (2015.01) |
| G06T 7/187 | (2017.01) |

(52) U.S. Cl.
CPC ............ *G06T 11/008* (2013.01); *B33Y 50/00* (2014.12); *G06T 7/11* (2017.01); *G06T 7/187* (2017.01); *G06T 2207/10081* (2013.01); *G06T 2207/10084* (2013.01); *G06T 2207/10088* (2013.01); *G06T 2211/416* (2013.01)

(58) Field of Classification Search
CPC ......... G06T 11/008; G06T 7/11; G06T 5/004; G06T 2207/10081; G06T 2207/10084; G06T 2207/10088; G06T 2211/416; B33Y 50/00
See application file for complete search history.

(56) References Cited

U.S. PATENT DOCUMENTS

| 5,647,360 A * | 7/1997 | Bani-Hashemi ........... G06T 5/50 382/130 |
| 8,429,174 B2 * | 4/2013 | Ramani ............ G06F 17/30259 345/419 |
| 2004/0106864 A1 * | 6/2004 | Rose ...................... A61B 5/055 600/410 |
| 2006/0094951 A1 | 5/2006 | Dean et al. |
| 2009/0010540 A1 * | 1/2009 | Mullick .................... G06T 7/38 382/170 |
| 2012/0224755 A1 | 9/2012 | Wu |
| 2013/0129170 A1 | 5/2013 | Zheng et al. |
| 2015/0138201 A1 | 5/2015 | Brown |
| 2015/0347682 A1 | 12/2015 | Chen et al. |
| 2016/0185045 A1 | 6/2016 | Linnell et al. |

(Continued)

OTHER PUBLICATIONS

Ahmed et al. A Modified Fuzzy C-Means Algorithm for Bias Field Estimation and Segmentation of MRI Data, IEEE Transactions on Medical Imaging, vol. 21, No. 3, Mar. 2002, 193-199.

(Continued)

*Primary Examiner* — Shefali D Goradia
(74) *Attorney, Agent, or Firm* — Pearl Cohen Zedek Latzer Baratz LLP

(57) ABSTRACT

Methods and systems for visualizing, simulating, modifying and/or 3D printing objects are provided. The system is an end-to-end system that can take as input 3D objects and allow for various levels of user intervention to produce the desired results.

16 Claims, 7 Drawing Sheets

(56) References Cited

U.S. PATENT DOCUMENTS

2016/0335770 A1* 11/2016 Lin ........................ A61B 6/481

OTHER PUBLICATIONS

Kindlmann, Gordon Lothar, Semi-Automatic Generation of Transfer Functions for Direct Volume Rendering, A Thesis Presented to the Faculty of the Graduate School of Cornell University in Partial Fulfillment of the Requirements for the Degree of Master of Science, Jan. 1999, 1-155.

* cited by examiner

SYSTEMS AND METHODS FOR AN INTEGRATED SYSTEM FOR VISUALIZING, SIMULATING, MODIFYING AND 3D PRINTING 3D OBJECTS

FIELD OF THE INVENTION

The invention relates generally to systems and methods for visualizing, simulating and 3D printing 3D objects. In particular, also relates generally to correcting three-dimensional ("3D") mask data. In particular, correcting by adding missing portions of masks or correcting by removing unwanted portions of masks.

BACKGROUND

Current systems can allow for visualizing three-dimensional ("3D") objects obtained with, for example, imaging devices, other systems and/or inputs. Currently, 3D objects can be processed for 3D printing, visualized on a two-dimensional ("2D") screen, and/or visualized in augmented and/or virtual reality. Typically the 3D object is manually processed through various systems such that it can be 3D printed, visualized on a 2D screen, and/or visualized in augmented and/or virtual reality. For example, in order to 3D print a 3D object, the 3D object can be segmented, masks created, and/or a mesh created.

Typically, manual transformation can require that a user engage multiple systems, provide inputs/outputs for each system, and/or understand how to run each system. This can be time consuming and unrealistic for a medical professional to perform. Manual processing of 3D objects (e.g., transforming 3D objects and moving the data between systems) can contribute to introduction of errors.

Therefore, it can be desirable to provide an end-to-end system that can allow 3D objects to be rendered for a 2D screen, rendered for virtual reality and/or 3D printed. It can also be desirable to provide a system for volume rendering that has sufficient speed such that a user can zoom into and out of the visualized volume, modify the visualized volume, create one or more masks from the 3D object and/or create one or more mesh from the 3D object.

The one or more masks can be based on a type of the object of the 3D object. For example, for a CT scan of a heart, the corresponding masks can include a right ventricle mask, a left ventricle mask, a right atrium mask, a left atrium mask, an aorta mask, a pulmonary artery mask, a blood volume mask and/or a soft tissue mask. A portion of the CT scan data can correspond to each mask and can be assigned to its respective mask accordingly.

The masks can be used to visualize the 3D object on a two-dimensional ("2D") screen. In some scenarios, the 3D object can be missing data or can include extraneous data. In both cases, a mask created from that imaging data, when rendered into a format that is suitable for viewing on a 2D screen, can appear erroneous to the viewer. In some systems, the masks can be used as a basis for 3D printing. In these scenarios, a 3D printed model of mask data that is missing portions or includes extraneous portions can result in a 3D printed model that does not fully represent the object. For medical application, a doctor can use the 3D printed model or the visualized mask data to learn about/practice operations on body part of a particular patient. If the mask data is missing portions or includes extraneous portions, the doctor may not know this is an error, and may base treatment of a patient on this erroneous data.

In industrial applications, missing mask data can result in many errors, for example, erroneous 3D printed objects. Therefore, it can be desirable to correct masks. Further it is desirable to correct masks to improve precision of the mask.

Current methods for correcting mask data typically can involve a user manually correcting the mask. For example, for 3D imaging data, a user can modify the 3D imaging data slice by slice. Current methods can require an in-depth understanding of the 3D object and/or computer image rendering by the user. Typically the person viewing the data (e.g., a doctor or an industrial process engineer) may not have a sufficient level of understanding to modify the data. Thus, manual correction can typically require two people.

These methods can also contribute to imprecision in the mask data due to, for example, human error. For example, a user may accidentally correct a portion of the 3D object that is not actually erroneous, resulting in further errors in the masks. In addition, the manual process of correcting the data can increase an amount of data used by the computer overall. For example, each slice that is modified can increase the amount of data. Thus, manual correction is impracticable.

SUMMARY OF THE INVENTION

One advantage of the invention can include providing a more accurate representation of an object being imaged. Another advantage of the invention can include a reduction in an amount of data needed for correcting masks. Another advantage of the invention can include increasing a speed at which corrections can be made. Another advantage of the invention can include a reduction in cost, due to, for example, requiring less time, reduction of number of people, and more accuracy in mask correction. Another advantage of the invention can include providing an end-to-end system that can allow 3D objects to be processed such that it can be 3D printed, visualized on a 2D screen, and/or visualized in augmented and/or virtual reality without user intervention.

According to embodiments of the present invention, there is provided a method for correcting mask data, a non-transient computer readable medium containing program instructions for causing a computer to perform the method, and a system for visualizing and/or 3D printing 3D objects.

According to embodiments of the present invention, the method can include receiving a single voxel location, mask data of a 3D volume, and a region of interest of the 3D Volume. The single voxel location can be input by a user via clicking on a displayed image of the mask data.

The similarity between any voxel in the region of interest and one or more voxels in the mask data may be determined, and the mask may be modified based on the similarity. The similarity may be based on one or more features values of the one or more voxels in the mask data, the single voxel location, and the region of interest of the 3D volume. The 3D Volume data can be from a CT scan, a CBCT scan, an MRI image, or any combination thereof.

In some embodiments of the present invention, modifying the mask data includes removing one or more voxels from the mask data that are a connected component of the single voxel location and above a similarity threshold. Modifying the mask data may include adding one or more voxels into the mask data that are a connected component of the single voxel location and below a similarity threshold. The similarity threshold can be based on the single voxel location. In some embodiments of the invention, the similarity threshold can be further based on a distance between each voxel in the mask data of the 3D volume and the single voxel location.

In some embodiments of the invention, one or more feature values can be based on a volume intensity value, a response of a 3D volume to one or more spatial filters, a gradient magnitude of the volume intensity value, a Frangi filter response, or any combination thereof.

In some embodiments of the invention, the system includes at least one processor and at least one 3D printer. The processor can receive the 3D object and a process flow for the 3D object. The processor flow can be any combination of segmentation, mask modification, meshing, planning, designing, simulation, virtual reality, augmented reality, preparing for 3D printing, previewing for 3D printing, and/or 3D printing the 3D object.

BRIEF DESCRIPTION OF THE DRAWINGS

The foregoing and other objects, features, and advantages of the present invention, as well as the invention itself, is more fully understood from the following description of various embodiments, when read together with the accompanying drawings.

Figure 1:
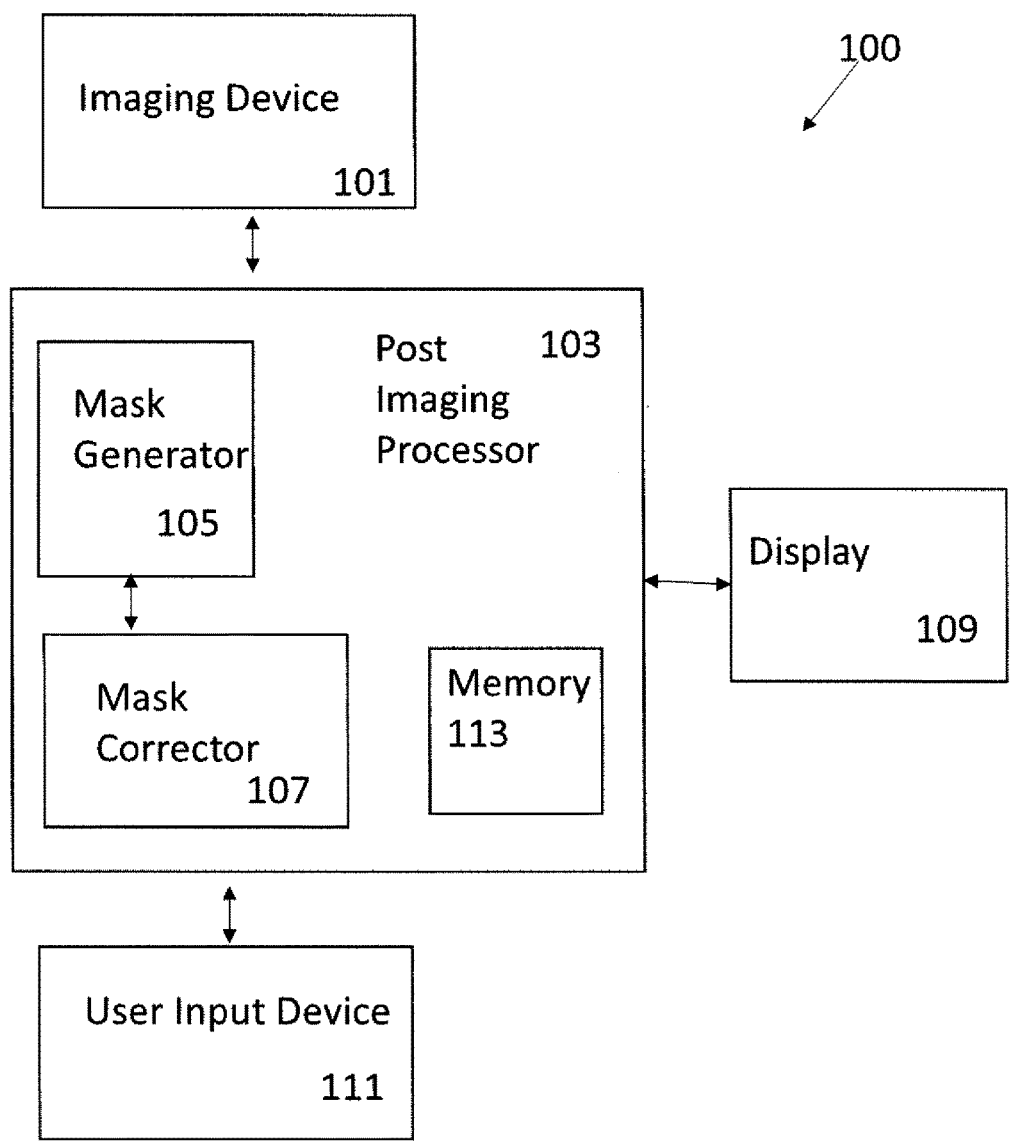
FIG. 1 is a diagram of a system for correcting three-dimensional mask data, according to an illustrative embodiment of the invention.

It is appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention are described. For purposes of explanation, specific configurations and details are set forth in order to provide a thorough understanding of the present invention. However, it is apparent to one skilled in the art that the present invention may be practiced without the specific details presented herein. Furthermore, well known features may be omitted or simplified in order not to obscure the present invention.

Generally, 3D objects can be assigned to masks. The masks can be used to visualize (e.g., on a 2D screen or in virtual reality) and/or 3D print all or a portion of the 3D object. Each mask can include extraneous data or be missing data. Each mask can be corrected by, adding or removing data from the mask.

Correcting the mask can involve identifying a region in the mask to correct (e.g., identifying a region of interest). The region of interest can be a subgroup of the entire 3D data. For example, one or more masks can be displayed to a user on a screen or in a virtual reality system, the user can select the region of interest (e.g., by clicking on the display with a mouse, or pointing to an area in virtual reality). The region of interest can include one mask or multiple masks. If the region of interest includes multiple masks, each mask in the region of interest can be corrected.

Correcting the mask can involve modifying at least one mask included in the region of interest. In some embodiments, removing one or more voxels from the mask data, can involve performing a logical negation of the mask, and performing substantially the same steps (or the same steps) as what is performed for adding to the mask.

FIG. 1 is a diagram of a system 100 for correcting three-dimensional mask data, according to an illustrative embodiment of the invention. The system 100 can include an imaging device 101, a post imaging processor 103, a user input device 111, and a display 109. In some embodiments of the invention, the display 109 is a part of user input device 111. The post imaging processor 103 may include a mask generator 105, a mask corrector 107, and a memory 113 to store imaging data, masks, and mask data. A mask may be, for example, data construct including for example Boolean (e.g., 1/0, yes/no) values for each voxel or data point in a larger data set. A mask may include visual markers (e.g., color and/or patterns) that specify appearance of the voxel. The mask when applied to the larger data set may indicate that a voxel is marked or is not marked.

The components of system 100 can communicate either by wire or wirelessly. In some embodiments the components of system 100 can be implemented on a single computer, or across different computers.

The imaging device 101 may transmit image data to the post imaging processor 103. The transmitted image data can be of a 3D volume of an object. In some embodiments of the invention, the imaging device 101 is a 3D Computed Tomography ("CT") device, a Cone Beam Computed Tomography ("CBCT") device, a Magnetic Resonance Imaging ("MRI") device, or any combination thereof.

The user input device 111 can be used to input data, and the user input device 111 can communicate with the post imaging processor 103. The user input device 111 can be a personal computer, desktop computer, mobile computer, laptop computer, and notebook computer or any other suitable device such as a cellular telephone, personal digital assistant (PDA), video game console, etc.

The user input device 111 and display 109 can be used to select a region of interest in the 3D volume. The region of interest in the 3D volume may be transmitted from the user input device 111 to the post imaging processor 103. In some embodiments of the invention, the region of interest is about [50×50×50] voxels. In some embodiments of the invention, the user selects the size of the region of interest.

The user input device 111 and display 109 can be used to select a single voxel location within a mask. In some embodiments of the invention, the single voxel location is input, via the user input device 111, e.g., by a user via clicking on an image of the mask data displayed on the display 109.

In some embodiments of the invention, after inputting the single voxel location via the user input device 111, the post imaging processor 103 may determine a location of the region of interest based on the single voxel location, an object type of the data and/or screen resolution. In various embodiments of the invention, the post imaging processor 103 determines the single voxel location based on regions that are expected to be present or absent in the masks, based on mask type and/or object type.

In some embodiments of the invention, the display 109 is a touch screen. In some embodiments of the invention, the user visualizes the 3D data via virtual reality glasses. In these embodiments, the user may input/select the region of interest in the 3D volume and/or the single voxel location in virtual reality.

The mask generator 105 of the post imaging processor 103 can create mask data from the image data received from the imaging device 101. For a particular object type, a mask set can be retrieved from memory and/or input by a user. The mask set can be one or more masks that can be used to represent the object type. The mask data can be created by segmenting the 3D object into the mask. The segmenting can be performed as is known in the art. The mask generator 105 of the post imaging processor 103 can transmit the mask data to the screen. The mask generator 105 can transmit all or a portion of the mask data to the mask corrector 107 of the post imaging processor 103. For example, if a region of interest is specified, the mask generator 105 can transmit the mask data to the mask corrector 107.

The mask corrector 107 can modify the mask data created by the mask generator 105 based on the inputs of the imaging device 101, the mask generator 105, and/or the user input device 111. In some embodiments of the invention, the mask corrector 107 modifies mask data. In some embodiments of the invention, the mask corrector 107 receives the mask and from mask generator 105. In some embodiments, the mask corrector 107 receives the 3D volume directly from the imaging device 101.

The mask corrector 107 can modify the mask data, based on a similarity between a single voxel location and one or more voxels in the mask data, to create a modified mask. In various embodiments of the invention, the similarity is based on one or more features values of the one or more voxels in the mask data, the single voxel location, and/or the region of interest of the 3D volume.

The post imaging processor 103 can store the corrected mask in the memory 113. The post imaging processor 103 can transmit the mask corrected by mask corrector 107 to the display 109 and/or virtual reality glasses. In some embodiments, the post imaging processor 103 transmits the corrected mask to a system that can convert the masks into data that can be used for 3D printing.

Figure 1A:
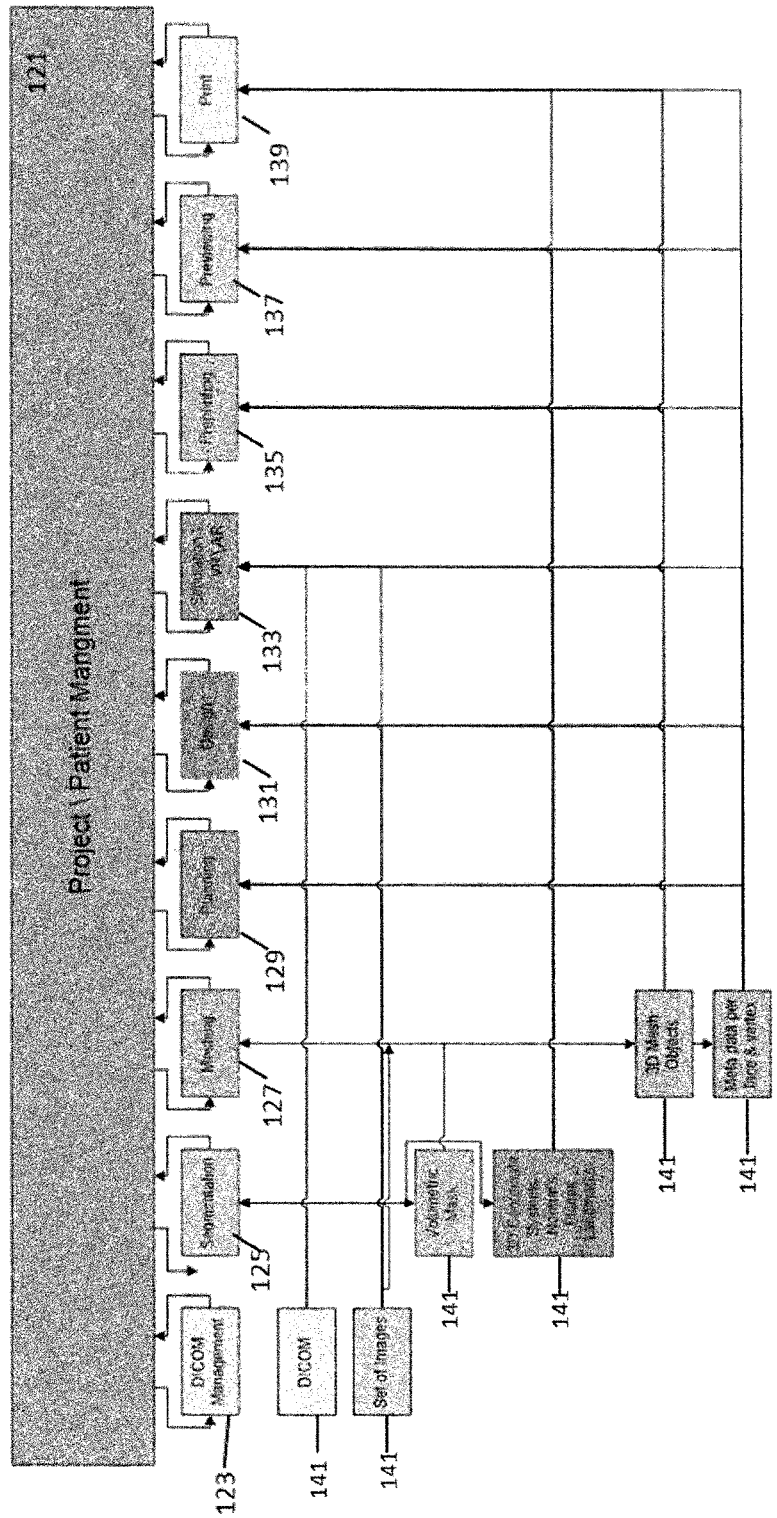
FIG. 1A is a diagram for an end-to-end system for 3D object handling, according to an illustrative embodiment of the invention.

FIG. 1A shows a block diagram of a system an end-to-end system for 3D object handling (e.g., visualization, simulation, modification, creation, and/or 3D printing) according to some embodiments of the invention. The system for volume rendering shown in FIG. 1A, can be an end-to-end system that can take as input 3D objects and produce a visualization on a screen or in virtual reality, and/or produce a 3D printed object of the 3D object. The 3D object can include any data that is representative of a 3D object. The 3D objects can include 3D imaging data, mesh data, volumetric objects, polygon mesh objects, point clouds, functional representations of 3D objects, cad files, 3D pdf files, STL files, and/or any inputs that can represent a 3D object. The 3D imaging data can include medical imaging data, including Computed Tomography ("CT") imaging data, a Cone Beam Computed Tomography ("CBCT") imaging data, a Magnetic Resonance Imaging ("MRI") imaging data and/or MRA imaging data (e.g., MRI with a contrast agent) or ultrasound imaging data. The 3D objects can be of anatomy (e.g., complex anatomy), industrial data, or any 3D object.

The system can include a project/patient management controller 121, a Digital Imagining and Communication Data (DICOM) management module 123, a segmentation module 125, a meshing module 127, a planning module 129, a design module 131, a simulation/VR/AR module 133, a preprinting module 135, a previewing module 137 and/or a 3D print module 139. The project/patient management controller 121 can receive inputs 141. The inputs 141 can be user inputs or data from a database.

Figure 1B:
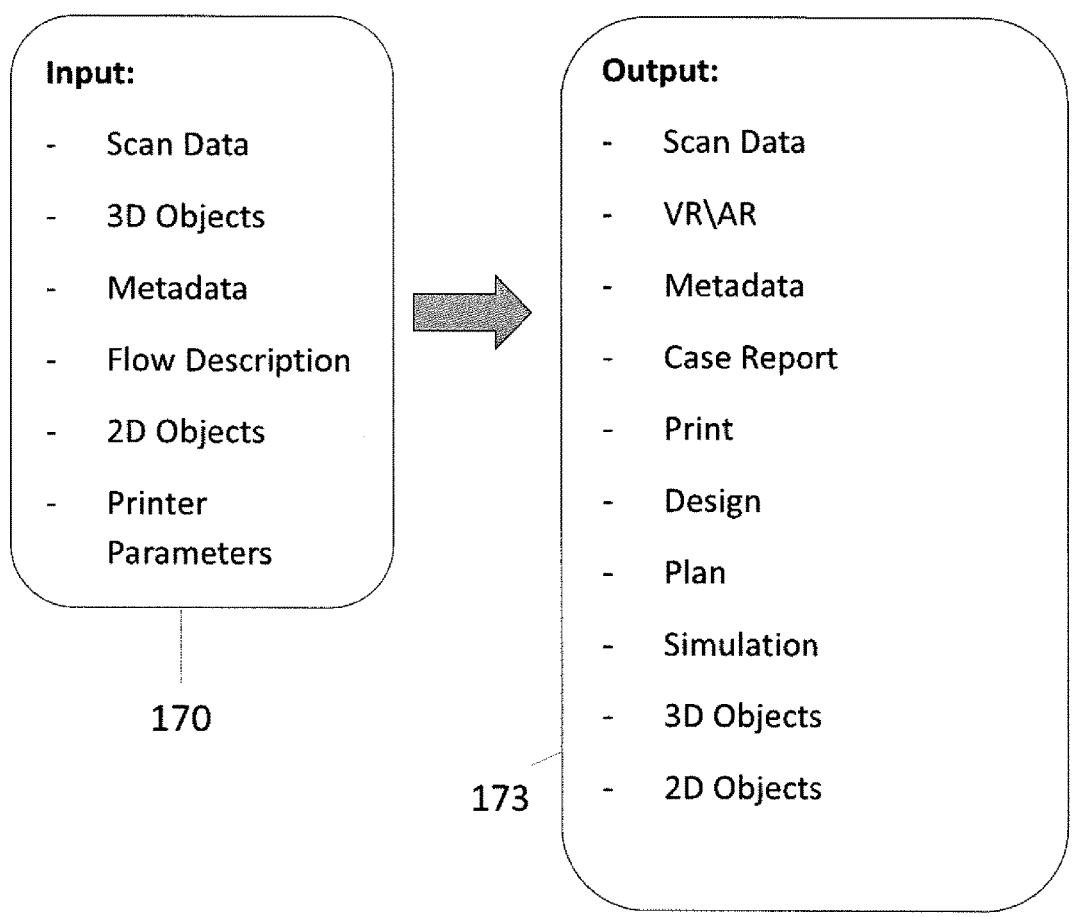
FIG. 1B is an example of inputs/outputs of the system of FIG. 1A.

Turning to FIG. 1B, FIG. 1B shows an example set of inputs 170 and output 173, according to illustrative embodiments of the invention. As shown in FIG. 1B, inputs 170 can include scan data, 3D objects, 2D objects, metadata, flow description, and/or printer parameters. The scan data can be 3D imaging data, and as described above, can be CT data, CBCT data, MRI data, and/or MRA data. In some embodiments, the scan data is any 3D imaging data as is known in the art. In some embodiments, the metadata includes object identification data (e.g., patient indicator), time of the scan, parameters used to take the scan and/or any other metadata as is known in the art. The flow description can be a specification of which modules in the system to use and/or the order to use the modules. The flow description can include any number of the modules in any combination. As is apparent to one of ordinary skill, some flows may not be possible (e.g., flow data that requires skipping module that creates masks before making a mesh). In some embodiments, the system can transmit, to the user, an error message based on the user's inputs. The printer parameters can include parameters that are specific to the particular 3D printer the current scan data is to be printed with. The 2D objects can be any documents input to the system, jpegs, and/or pdfs.

The outputs 173 can include scan data, VR/AR, metadata, case report, a 3D printed object, a design (e.g., modified input data), a plan, a simulation, 3D objects and/or 2D objects.

Turning back to FIG. 1A, the DICOM management module 123 can keep track of and/or manage DICOM data within the system. For example, the DICOM management module 123 can keep track of the DICOM data as it is imported, exported and/or explored within the system. The DICOM management module 123 can modify/update the DICOM metadata, export output data into a DICOM format and/or attach case data and/or other DICOM data to other metadata within the system. As is apparent to one of ordinary skill in the art, the DICOM management module 123 can be replaced with an imaging data module for 3D objects generally (e.g., industrial applications).

The segmentation module 125 can receive a 3D object and DICOM data and from the DICOM module 123. The DICOM data can include CT data (e.g. medical and/or industrial), MR data, CBCT data, any series of images, jpeg or tiff series, or any combination thereof. As is apparent to one of ordinary skill in the art, the DICOM data can include any data that represents a 3D object. The segmentation module 125 can segment the 3D object based on a type of the object of the 3D object and/or the DICOM data.

For example, if the type of object is a heart, then the segments can include a right ventricle, a left ventricle, a right atrium, a left atrium, blood vessels, and/or an aorta. The segmenting can involve segmenting the 3D object into one or more masks. The one or more masks can be stored in a mask database. The one or more masks can be input by a user. Continuing with the heart example, the one or more masks can be a right ventricle mask, a left ventricle mask, a right atrium mask, a left atrium mask, a blood vessels mask, and/or an aorta mask. The one or more masks can be populated with the 3D object data that corresponds to the particular mask type.

The meshing module 127 can receive the 3D object, the DICOM data and/or the one or more masks that correspond to the 3D object. The meshing module 127 can create a mesh for the 3D object. The mesh can be based on the type of object. For example, if the object type is a heart, a heart mesh can be retrieved from memory. The heart mesh that is retrieved can be modified based on the 3D object and the DICOM.

The planning module 129 can receive the 3D object, the DICOM data, the one or more masks and/or the mesh. The planning module 129 can receive as input one or more scenarios for which the 3D object can be visualized within. For example, patient specific 3D object data can be input into the system, and a user (e.g., doctor) can simulate the surgery on the patient's specific data. In another example, a user (e.g., doctor) can parts around to simulate and/or optimize a face reconstruction surgery.

The design module 131 can receive the 3D object, the DICOM data, metadata, the one or more masks, and/or the mesh. The design module 131 can allow creation of models for general use or tools such as surgical guides that are based on patient specific anatomy shown in the 3D object, for a surgeon to use during surgery. The design module 131 can include tool as are known in the art (e.g., CAD tools) for object creation.

The simulation/virtual reality module 133 can receive the 3D object, the DICOM data, the one or more masks and/or the mesh. The simulation/virtual reality module can transform its input into a format that is acceptable by virtual reality glasses.

The 3D object can be 3D printed. The preprinting 135, previewing 137 and print module 139 can receive as input a mesh corresponding to the 3D object. The preprinting module 135 can determine whether or not the input can be 3D printed (e.g., based on wall thickness analysis and/or strength analysis. In some embodiments, the preprinting module 135 can smooth, simplify, close, fix and/or add support to the data to be printed. The previewing module 137 can provide a visualized version of expected outcome of 3D printing of the data to be printed. This can allow, for example, identification and/or correction of any errors that are likely to occur based on the 3D printing of the data. The print module 139 can be actual software of the 3D printer. In this manner, the system can seamlessly integrate with current 3D printers.

The system can include a project/patient management module 121. The project/patient management module can receive as input a desired task of a user (e.g., view 3D object in virtual reality, 3D print a mesh of the 3D object, and/or visualize the imaging data). Based on the desired task, the project/patient management module 121 can instantiate a subset of the modules shown in FIG. 1A to accomplish the desired task. The project/patient management module 121 can evaluate a flow specified by the input and execute the flow, and/or determine modifications to the flow, based on, for example the 3D image data.

In some embodiments, the system is end-to-end, such that a user can input the 3D object, specify whether the data is to be visualized and/or 3D printed, and the system performs the visualization/3D print. In some embodiments, during visualization a user can modify the visualized object. The user can modify (e.g., recolor, zoom, stretch, etc.) an image of the segmented data, one or more masks, and/or the mesh. The user can select to view/modify all masks or a subset of masks.

Figure 2:
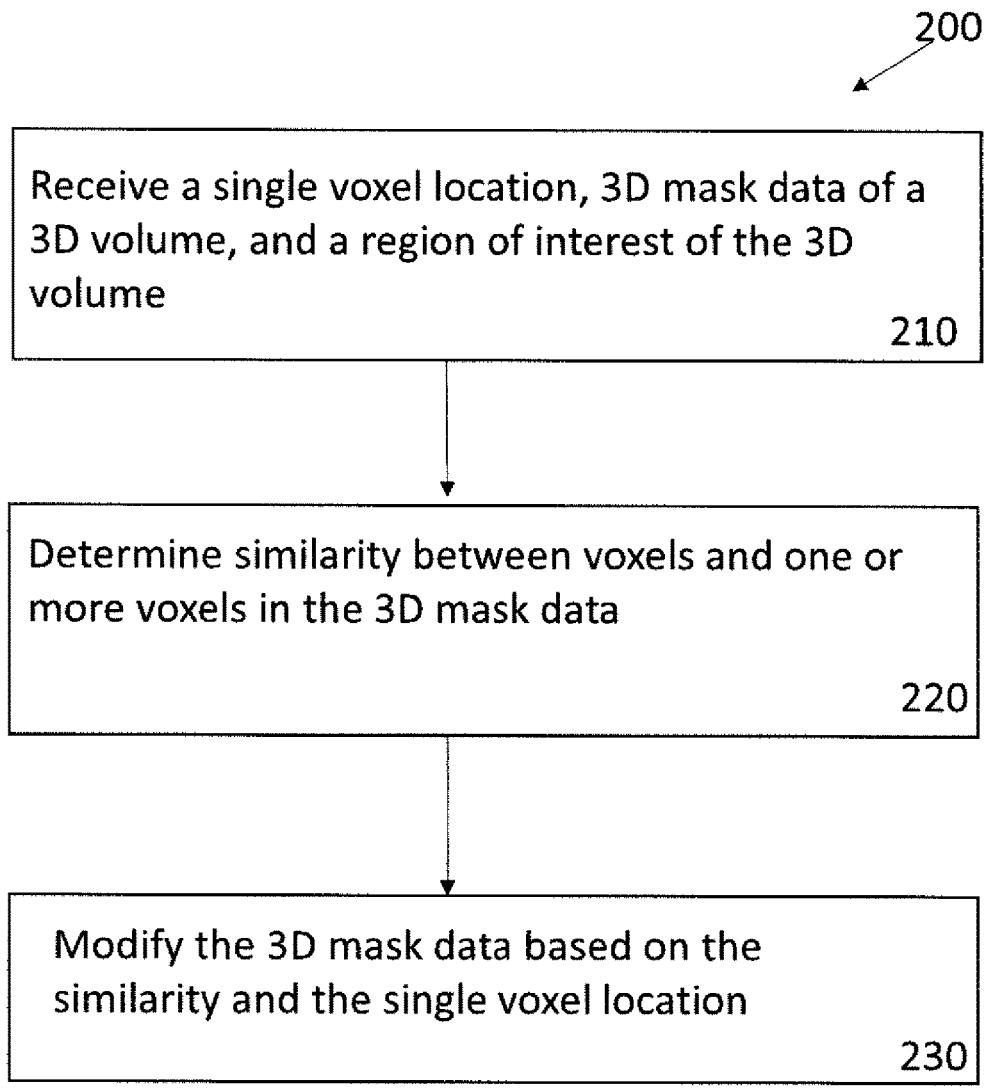
FIG. 2 is a flow diagram illustrating a method for correcting three-dimensional mask data, according to an illustrative embodiment of the invention.

FIG. 2 is a flow diagram 200 illustrating a method for correcting three-dimensional mask data, according to an illustrative embodiment of the invention.

The method can involve receiving a single voxel location, mask data of a 3D volume, and a region of interest of the 3D volume (Step 210) (e.g., receiving by the post imaging processor 103, as shown above in FIG. 1).

The single voxel location can be seed point coordinates (e.g., denoted by $\vec{s}$). The seed point coordinates can be coordinates on a 2D screen or a set of coordinates in a 3D virtual reality space. The seed point can indicate a location on one or more masks to be corrected. The correction can be addition of data into the one or more masks or removal of data from the one or more masks. A determination of whether the correction is to remove data or add data can be based on the seed point $\vec{s}$.

Masks can be expressed generally as $B(\vec{x})$. The mask to be modified can have data added to it or removed from it. In some embodiments, the mask can be expressed as shown in EQNs. 1 and 2, as follows:

$$\text{Adding to the Mask: } B(\vec{x}) = B_0(\vec{x}) \qquad \text{EQN. 1}$$

$$\text{Removing from the Mask: } B(\vec{x}) = \sim B_0(\vec{x}) \qquad \text{EQN. 2}$$

where $B_0(\vec{x})$ is the mask for the specific region of interest (e.g., an input mask), $B(\vec{x})$ is either the mask $B_0(\vec{x})$ or the logical negation of the mask $\sim B_0(\vec{x})$, if adding to the mask or removing from the mask, respectively.

In some embodiments, a user selects the seed point via a user input device (e.g., the user input device 111, as shown above in FIG. 1). In some embodiments, the seed point is determined based on a type of the mask, a type of the object, or any combination thereof. For example, assume the object is a wrist and the mask to be corrected represents a vein of the wrist, if portions of the interior of the vein are missing from the mask, the seed point can be set to a location within the missing portion of the interior of the vein.

The method can involve determining similarity between any voxel location within the region of interest and one or more voxels in the mask data (Step 220) (e.g., determining by the mask corrector 107 as described above in FIG. 1). The similarity may be based on one or more features values of the one or more voxels in the mask data, the single voxel location, the region of interest of the 3D volume, or any combination thereof. In some embodiments, the similarity is determined as shown below in EQNs 3-13, as follows:

Determining the similarity can involve determining a Euclidian distance (e.g., denoted by $D(\vec{x})$) of each voxel from the seed point $\vec{s}$. The Euclidian distance can be determined as shown in EQN. 3, as follows:

$$D(\vec{x}) = \sqrt{(x_1 - s_1)^2 + (x_2 - s_2)^2 + (x_3 - s_3)^2} \qquad \text{EQN. 3}$$

where $x_1$, $x_2$, and $x_3$ represent the x, y, and z coordinates a voxel in the region of interest that is compared to the seed point $\vec{s}$, and $s_1$, $s_2$, and $s_3$ represent the x, y, and z coordinates of the seed points.

Determining the similarity can involve determining a weight for each voxel based on the Euclidian distance between each voxel and the seed point. Each voxel's weight can be determined as shown below in EQN. 4, as follows:

$$W(\vec{x}) = \omega(D(\vec{x})) \qquad \text{EQN. 4}$$

Where $W(\vec{x})$ is the weight of a voxel that is compared to the seed point $\vec{s}$ and $\omega$ is a scalar function that decays as the distance from its origin increases. For example, in some embodiments, $\omega$ can be determined as shown in EQN. 5, as follows:

$$\omega(y) = \frac{1}{\sqrt{y}} \qquad \text{EQN. 5}$$

where y is any real number larger than zero.

In some embodiments, the similarity measure of a feature i is denoted by $C_i(\vec{x})$. The similarity measure $C_i(\vec{x})$ be determined as shown in EQNs 6 through 10, as follows:

$$T_i^{in} = \frac{\frac{\Sigma_{[\vec{x}|B(\vec{x})=TRUE]}(w(\vec{x}) \times F_i(\vec{x}))}{\Sigma_{[\vec{x}|B(\vec{x})=TRUE]}W(\vec{x})} + F_i(\vec{s})}{2} \qquad \text{EQN. 6}$$

$$T_i^{out} = \frac{\Sigma_{[\vec{x}|B(\vec{x})=FALSE]}(W(\vec{x}) \times F_i(\vec{x}))}{\Sigma_{[\vec{x}|B(\vec{x})=FALSE]}W(\vec{x})} \qquad \text{EQN. 7}$$

$$T_i^{full} = \frac{\Sigma_{[\vec{x}]}(W(\vec{x}) \times F_i(\vec{x}))}{\Sigma_{[\vec{x}]}(W(\vec{x}))} \qquad \text{EQN. 8}$$

$$\lambda_i = \left(\frac{|T_i^{in} - T_i^{out}|}{T_i^{full}}\right)^{\gamma_1} \qquad \text{EQN. 9}$$

$$C_i(\vec{x}) = \qquad \text{EQN. 10}$$
$$\begin{cases} \max(0, \lambda_i \times (T_i^{in} - F_i(\vec{x}))) & T_i^{in} > T_i^{out} \wedge B(\vec{x}) = FALSE \\ \max(0, \lambda_i \times (F_i(\vec{x}) - T_i^{in})) & T_i^{in} \leq T_i^{out} \wedge B(\vec{x}) = FALSE \\ 0 & B(\vec{x}) = TRUE \end{cases}$$

where $\gamma_1$ is a feature contribution power with a value of 1 and $F_i(\vec{x})$, are feature values as a function of a voxel's coordinates $\vec{x}$ in the region of interest. Examples of feature values can include volume intensity values, a response of a 3D volume to spatial filters, a gradient magnitude of the volume intensity values, and a Frangi filter response, all of which are known in the art.

Determining the similarity can be based on $C_i(\vec{x})$. The similarity can be determined as shown in EQN 11-13, as follows:

$$G_1(\vec{x}) = (NZ(\Sigma_i C_i(\vec{x})))^{\psi_1} \qquad \text{EQN. 11}$$

$$G_2(\vec{x}) = [(Geo(G_1(\vec{x}), B(\vec{x})))^{\psi_2} \times (1+D(\vec{x}))^{\psi_3}]^{\psi_4} \qquad \text{EQN. 12}$$

$$G(\vec{x}) = G_1(\vec{x}) \times G_2(\vec{x}) \qquad \text{EQN. 13}$$

where $G(\vec{x})$ is the similarity, $\psi_1$ is a first feature metric power, $\psi_2$ is a second feature metric power, $\psi_3$ is a third feature metric power, $\psi_4$ is a fourth feature metric power, all of the metric powers can be real numbers, $NZ(\phi)$ is a normalization function which may be a linear transformation which transforms the range of any scalar field to a normalized range [0,1], and Geo(Volume input, logical mask input) is a geodesic distance function as implement in MATLAB.

In some embodiments, $\psi_1$ has a value of 2. In some embodiments, $\psi_2$ has a value of 0.5. In some embodiments, $\psi_3$ has a value of 0.5 if voxels are being added to the mask and a value of 2 if voxels are being removed from the mask. In some embodiments, $\psi_4$ has a value of 1 if voxels are being added to the mask and a value of 2 if voxels are being removed from the mask.

The method can involve modifying the mask data based on the similarity (Step 230) (e.g., modifying by the mask corrector 107 as described above in FIG. 1).

Modifying the mask based on the similarity value can involve determining a threshold based on the seed position. The threshold can be determined as shown in EQN. 14, as follows:

$$g_0 = \theta \times G(\vec{s}) \qquad \text{EQN. 14}$$

where $g_0$ is a threshold, $\theta$ is a scalar value (e.g., equal to 10 when adding data to the mask and equal to 100,000 when removing data from the mask, and $G(\vec{s})$ is a similarity evaluated at a seed position $\vec{s}$.

The modified mask can be determined as shown in EQN. 15, as follows:

$$M_0 = G(\vec{x}) < g_0 \wedge \sim B(\vec{x}) \qquad \text{EQN. 15}$$

where $M_0$ is the modified mask containing all voxels with a similarity measure less than the threshold $g_0$ and outside of $B(\vec{x})$, $G(\vec{x})$ is the similarity as described above in EQN. 13, and $\sim B(\vec{x})$ is an inverse of the mask $B(\vec{x})$.

In some embodiments, determining the modified mask also involves dilating the modified mask by one voxel in all directions. The modified mask can be closed as shown below in EQN. 16, as follows:

$$M_1 = \text{Morphological closing with radius 1 of } M_0. \qquad \text{EQN. 16}$$

where $M_1$ is the modified mask $M_0$ closed.

In some embodiments, determining the modified mask can also involve reducing the modified mask $M_1$ to include only data that was not included in the original mask. The modified mask $M_1$ can be reduced as shown below in EQN. 17 as follows:

$$M_2 = M_1 \wedge \sim B(\vec{x}) \qquad \text{EQN. 17}$$

where $M_2$ is the portions of $M_1$ having data that is not in the $B(\vec{x})$.

Modifying the mask based on the similarity can also involve determining an output mask, as shown below in EQN. 18:

$$\text{Output Mask} = \begin{cases} M_f \vee B(\vec{x}) & \text{adding to the mask} \\ \sim(M_f \vee B(\vec{x})) & \text{removing from the mask} \end{cases} \qquad \text{EQN. 18}$$

Where $M_f$ is the modification.

Figure 3A:
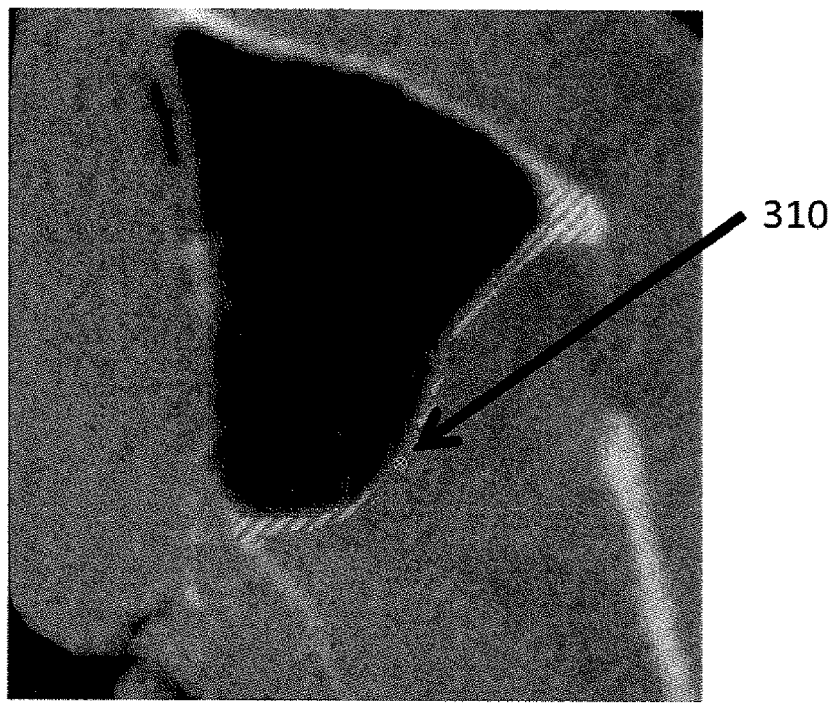
FIGS. 3A-5B are examples of masks that are corrected via adding or removing from the mask, according to illustrative embodiments of the invention.
Figure 3B:
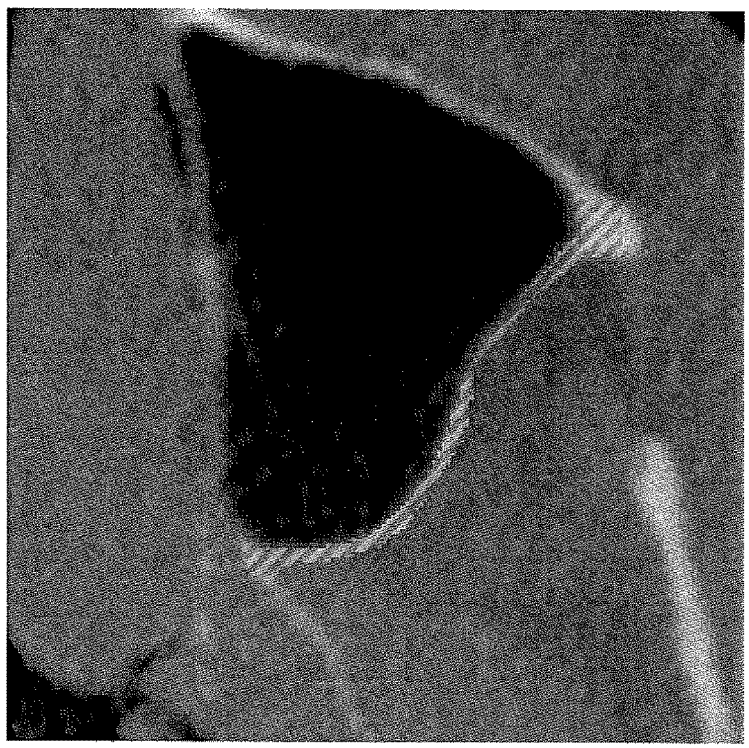
Figure 4A:
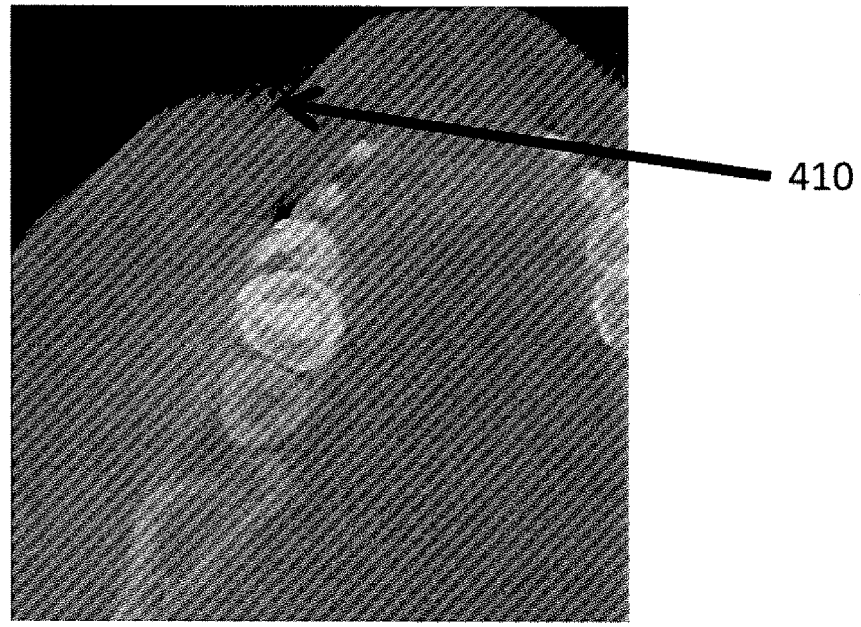
Figure 4B:
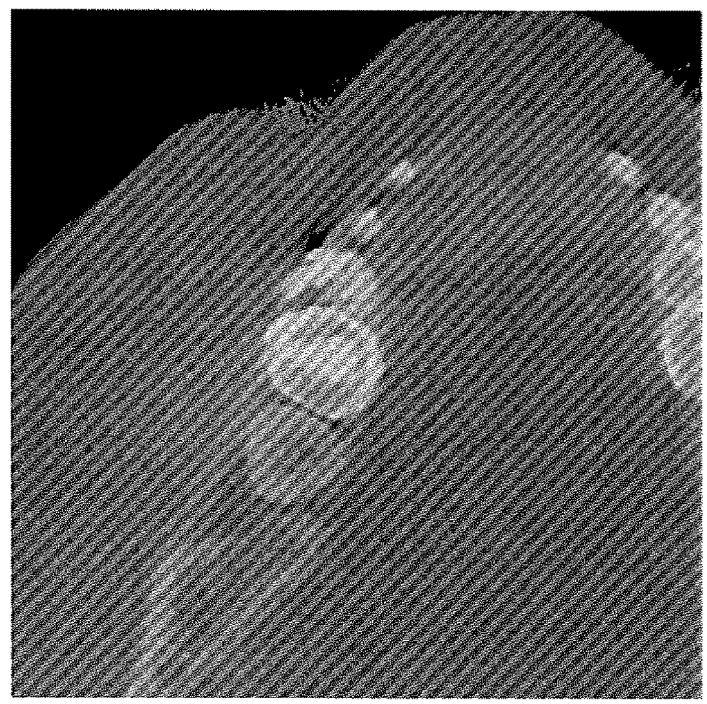
Figure 5A:
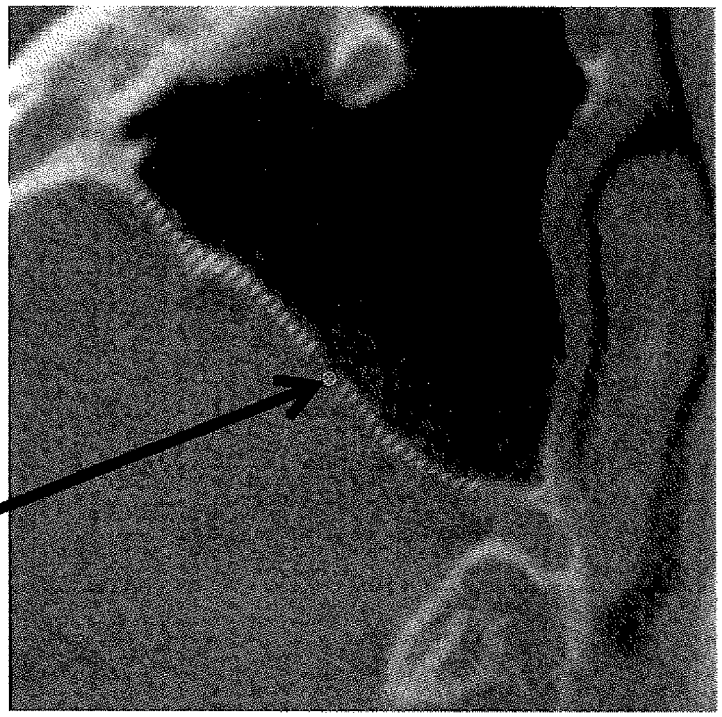
Figure 5B:

FIGS. 3A-5B are examples of masks that are corrected via addition or removing from the mask, according to illustrative embodiments of the invention. FIG. 3A is an example of a mask that has a seed point where there is no data 310. FIG. 3B is an example of the correction that includes adding data in a region around the seed point 310. FIG. 4A is an example of a mask that includes teeth with a seed point 410 where there is data present. FIG. 4B is an example of the correction that includes removing data in a region around the seed point 410. FIG. 5A is an example of a mask of that includes adding data in a region around a seed point 510. FIG. 5B is an example of the correction that includes adding data in a region around the seed point 510.

Comprise, include, and/or plural forms of each are open ended and include the listed parts and can include additional parts that are not listed. And/or is open ended and includes one or more of the listed parts and combinations of the listed parts.

It is apparent to one skilled in the art that the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for correcting mask data, the method comprising:
   receiving a single voxel location, mask data of a 3D volume and a region of interest of the 3D volume;
   determining similarity between any voxel in the region of interest and one or more voxels in the mask data, the similarity is based on one or more features values of the one or more voxels in the mask data, the single voxel location, and the region of interest of the 3D volume; and
   modifying the mask data based on the similarity.

2. The method of claim 1 wherein modifying the mask data comprises removing one or more voxels from the mask data that are a connected component of the single voxel location and above a similarity threshold.

3. The method of claim 1 wherein modifying the mask data comprises adding one or more voxels into the mask data that are a connected component of the single voxel location and below a similarity threshold.

4. The method of claim 2 wherein the similarity threshold is based on the single voxel location.

5. The method of claim 1 wherein the one or more feature values are based on
   a volume intensity value,
   a response of a 3D volume to one or more spatial filters,
   a gradient magnitude of the volume intensity value,
   a Frangi filter response, or any combination thereof.

6. The method of claim 1 wherein determining the similarity is further based on a distance between each voxel in the mask data of the 3D volume and the single voxel location.

7. The method of claim 1 wherein the single voxel location is input by a user via clicking on a displayed image of the mask data.

8. The method of claim 1 wherein the region of interest of the 3D volume data is from a CT scan, a CBCT scan, an MRI image, or any combination thereof.

9. A non-transient computer readable medium containing program instructions for causing a computer to perform the method of:
   receiving a single voxel location, mask data of a 3D volume and a region of interest of the 3D volume;
   determining similarity between any voxel in the region of interest and one or more voxels in the mask data, the similarity is based on one or more features values of the one or more voxels in the mask data, the single voxel location, and the region of interest of the 3D volume; and
   modifying the mask data based on the similarity.

10. The non-transient computer readable medium of claim 9 wherein modifying the mask data comprises removing one or more voxels from the mask data that are a connected component of the single voxel location and above a similarity threshold.

11. The non-transient computer readable medium of claim 9 modifying the mask data comprises adding one or more voxels into the mask data that are a connected component of the single voxel location and below a similarity threshold.

12. The non-transient computer readable medium of claim 9 wherein the similarity threshold is based on the single voxel location.

13. The non-transient computer readable medium of claim 9 wherein the one or more feature values are based on
   a volume intensity value,
   a response of a 3D volume to one or more spatial filters,
   a gradient magnitude of the volume intensity value,
   a Frangi filter response, or any combination thereof.

14. The non-transient computer readable medium of claim 9 determining the similarity is further based on a distance between each voxel in the mask data of the 3D volume and the single voxel location.

15. The non-transient computer readable medium of claim 9 wherein the single voxel location is input by a user via clicking on a displayed image of the mask data.

16. The non-transient computer readable medium of claim 9 wherein the region of interest of the 3D volume data is from a CT scan, a CBCT scan, an MRI image, or any combination thereof.

* * * * *